Figure 3:
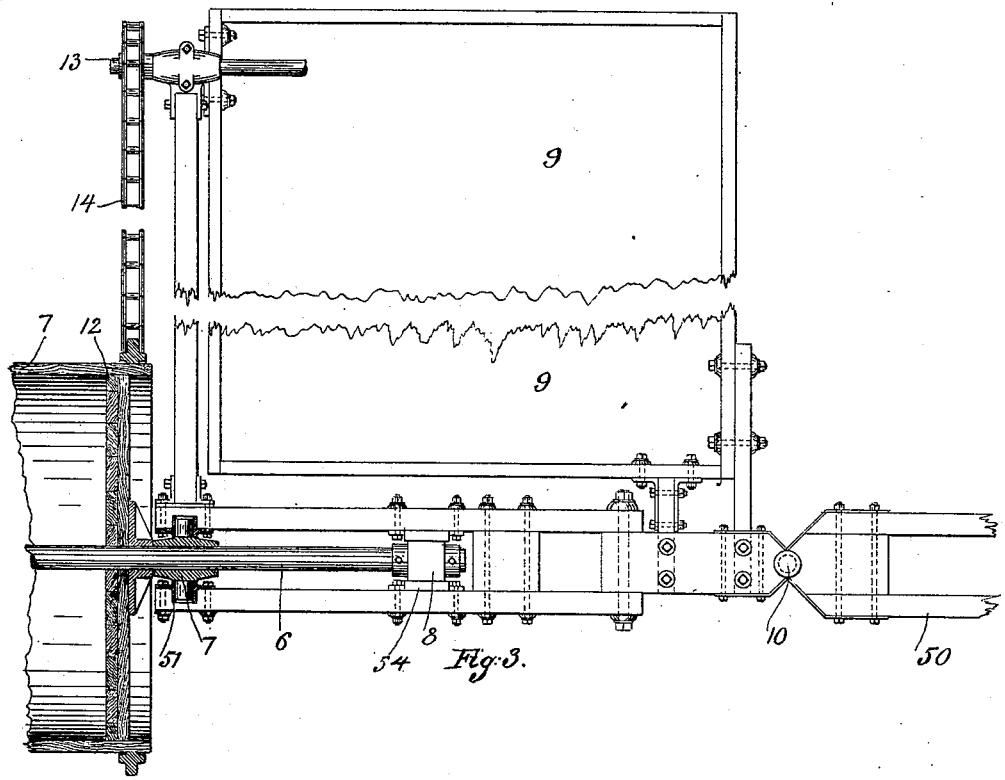

No. 646,712. Patented Apr. 3, 1900.
J. E. SYMONS.
WATER MOTOR.
(Application filed Apr. 17, 1897.)
(No Model.) 6 Sheets—Sheet 1.
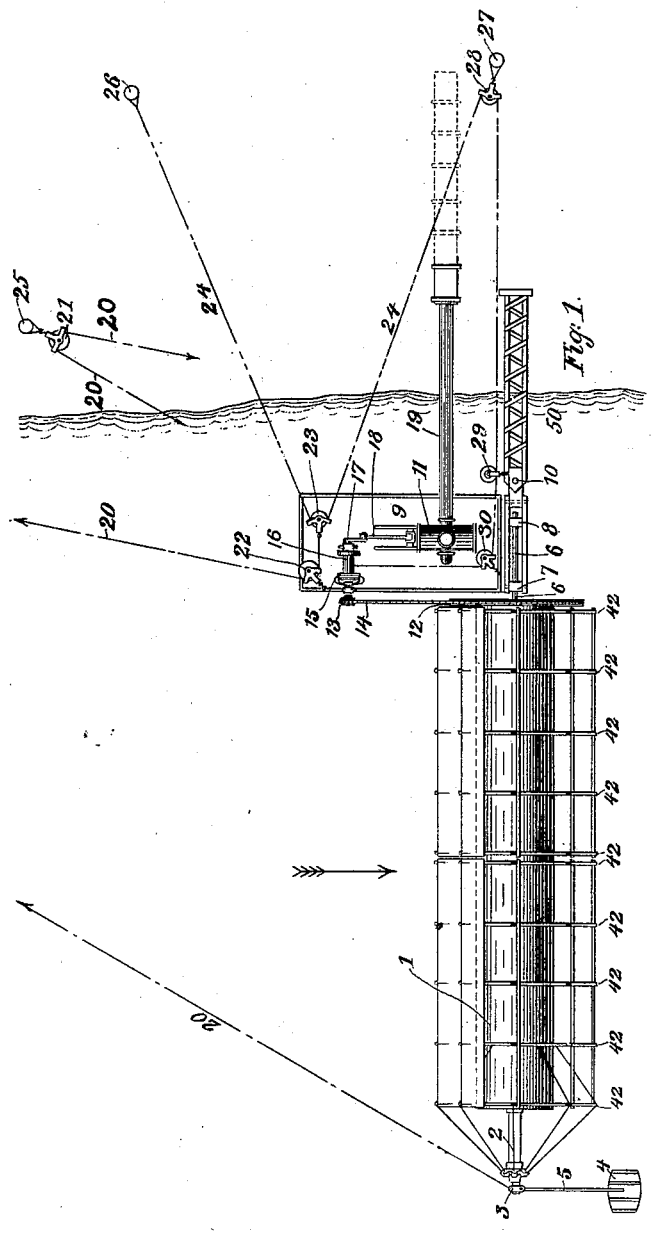
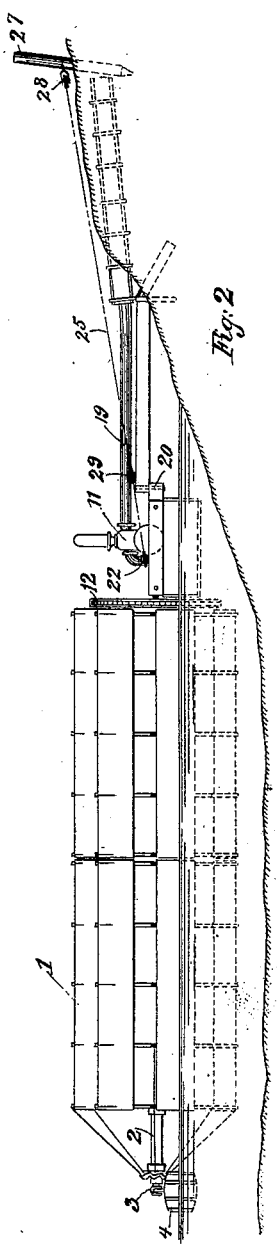
Witnesses:
D. B. Cheever
Charles L. Hine
Inventor:
Josiah E. Symons
by
Atty.

No. 646,712. Patented Apr. 3, 1900.
J. E. SYMONS.
WATER MOTOR.
(Application filed Apr. 17, 1897.)
(No Model.) 6 Sheets—Sheet 2.

Witnesses:
D. B. Cheever
Charles L. Shine

Inventor
Josiah E. Symons
by
Atty.

No. 646,712. Patented Apr. 3, 1900.
J. E. SYMONS.
WATER MOTOR.
(Application filed Apr. 17, 1897.)
(No Model.) 6 Sheets—Sheet 4.

Witnesses:
D. B. Cheever
Charles L. Shine

Inventor:
Josiah E. Symons
by Robt H. Parkinson
Atty

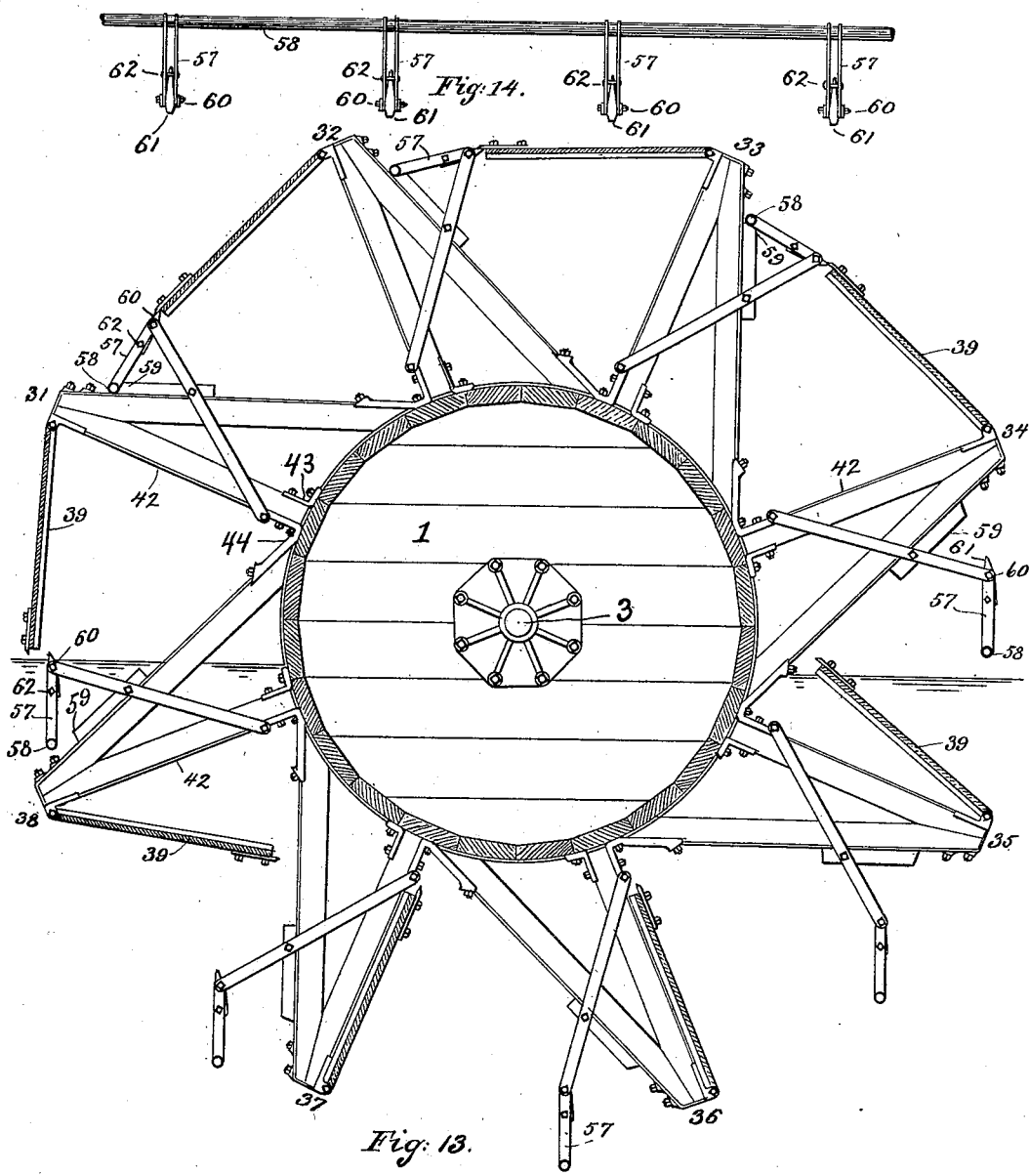

UNITED STATES PATENT OFFICE.

JOSIAH E. SYMONS, OF BOISE, IDAHO.

WATER-MOTOR.

SPECIFICATION forming part of Letters Patent No. 646,712, dated April 3, 1900.

Application filed April 17, 1897. Serial No. 632,561. (No model.)

*To all whom it may concern:*

Be it known that I, JOSIAH E. SYMONS, residing at Boise city, in the county of Ada and State of Idaho, have invented a certain new and useful Improvement in Water-Motors; and I declare the following to be a full, clear, and exact description of the invention in its best form now known to me, such as will enable others skilled in the art to which it relates to make and use the same, reference being had to the accompanying drawings, which form a part of this specification.

The object of my invention is to produce a motor capable of utilizing over any required extent the power afforded in flowing streams without being dependent on cataracts, dams, or raceways which can be used in whatever part of the stream may be desired and readily changed in position or moved from place to place or adapted to different depths or velocities of current, as occasion may demand, which requires no vertical support other than that furnished by the water, and which is adapted to be easily thrown into or out of working position or adjusted to different angles to vary the degree of power applied at the will of the operator.

It consists in a hollow water-tight drum of any desired length adapted to be supported by the stream in which it works, provided with feathering-blades adapted to enter and leave the stream edgewise, folding inward toward the axis of the drum and sustained in a radial position after entering the water, in the manner of applying such blades and controlling their position, so as to obtain a maximum of efficiency with a minimum of retardation and the means by which this is accomplished, in provisions for setting such motor at any desired position in the stream and for adjusting the same crosswise of the current or to any desired angle to the current, in means for adapting the motor to different depths or velocities of current and to ready placement in the current and transportation from one to another location, as required, and in means whereby these general purposes are secured and the motor made convenient and effective, more particularly mentioned in the following specification.

This invention is especially adapted to use on the streams of regions where there is occasion to raise and transfer water for mining or irrigating purposes, or in other remote regions where power is temporarily desired at different locations, or where the stream is subject to substantial changes of breadth, depth, course, or rapidity of current, or where there is not sufficient fall to effectually apply ordinary water-wheels, or where it is necessary to apply through a single motor a greater amount of power than it is practicable to obtain by ordinary water-wheels, or where for any reason it is necessary to economically apply the power derivable from a wide surface of water flowing at a moderate rate and with slight declivity. It is also useful under other conditions whenever for any purpose it is desirable to employ the power of a current of such character that it is practicable to float such a motor thereon.

A water-wheel mounted on bearings which sustain its weight is incapable of economical application to an ordinary current, and it is impracticable to extend such a wheel over a sufficiently-wide expanse to accumulate much more power than is consumed in overcoming its own frictional resistance on its bearings, while the expense and inconvenience of mounting and supporting it and the difficulty of adjusting and transferring it, according to the conditions of the stream or the location of the service required, further disqualify it for many of the uses which it is my purpose to serve. A broad wheel vertically supported only by its bearings is liable to sag and throw the shaft out of alinement. A drum floating in the current provided with ordinary fixed radial blades would encounter so much resistance in the descent and ascent of the blades that no appreciable power would remain to be transmitted. My invention, which enables me to apply directly through a single motor and without the expense of sinking piers or other solid or permanent supports the power obtained over any breadth of current required, is illustrated in the accompanying drawings.

Figure 4:
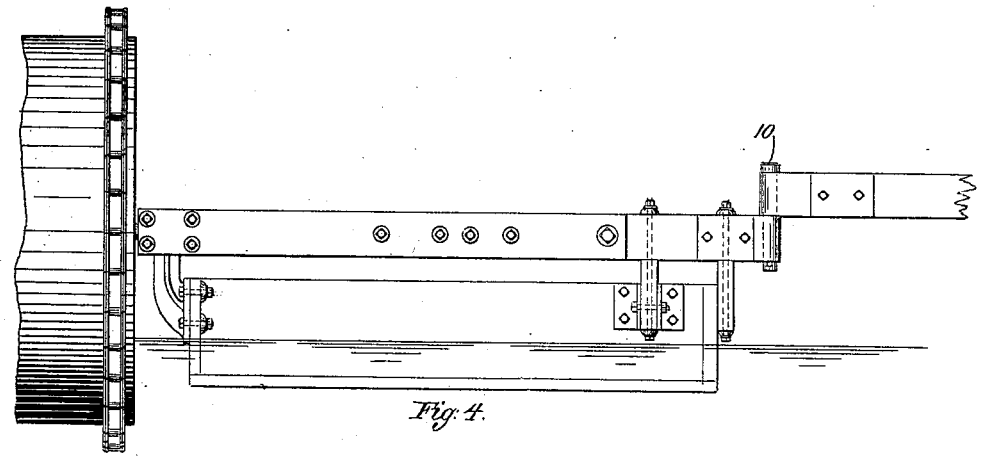
Figure 5:
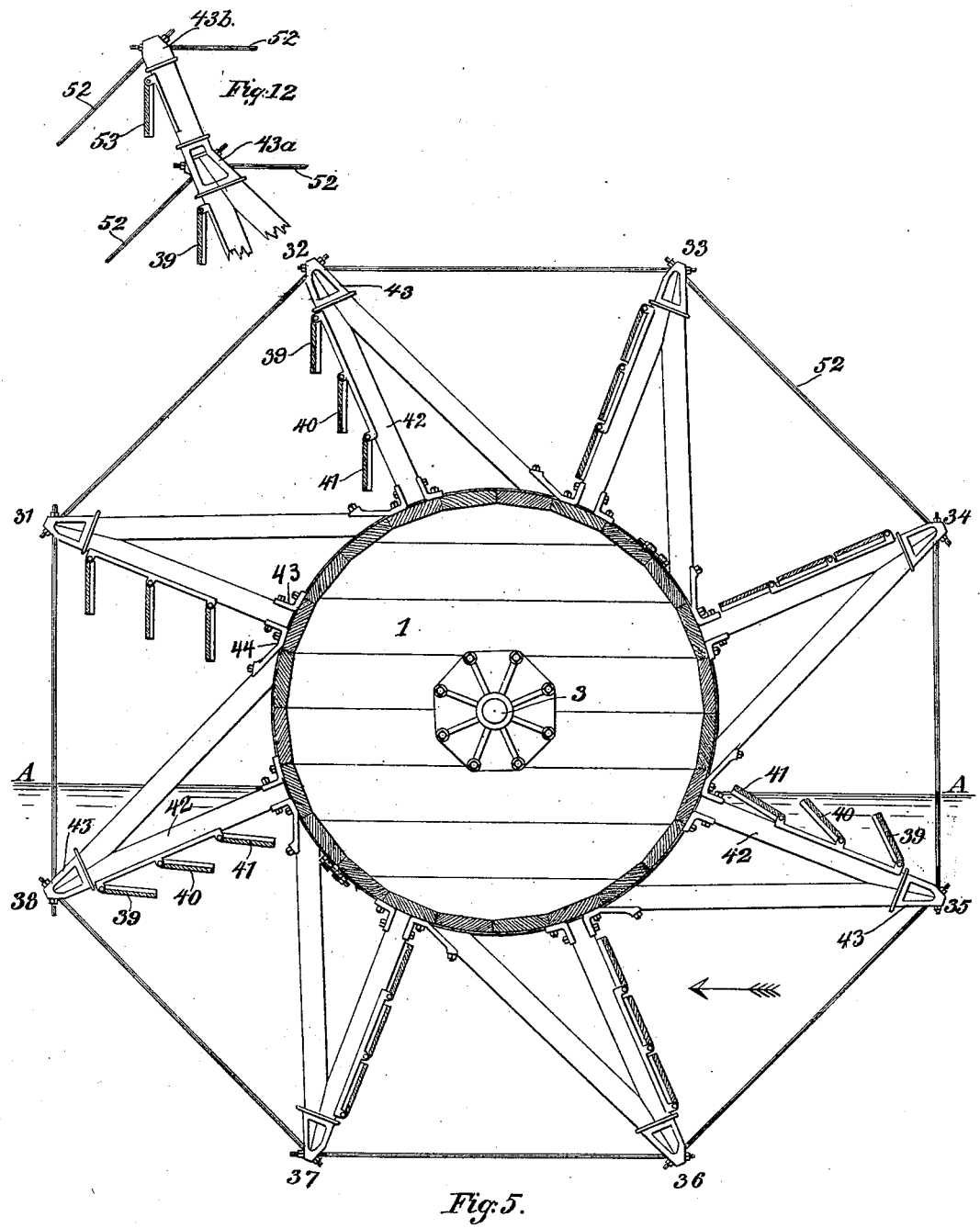
Figure 6:
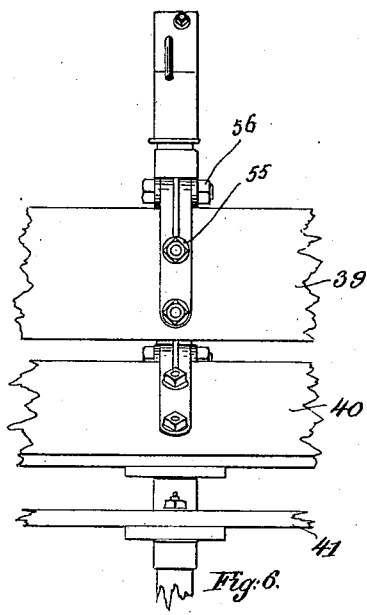
Figure 7:
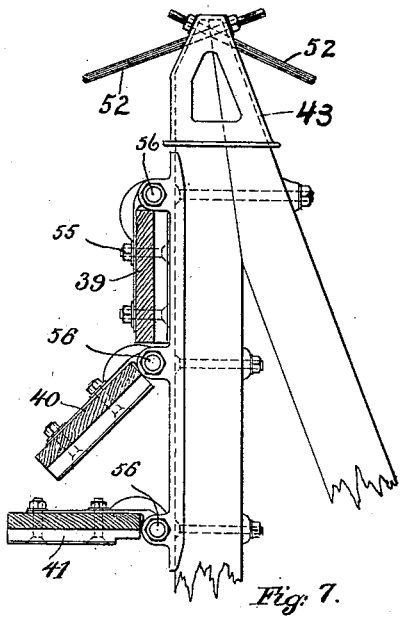
Figure 8:
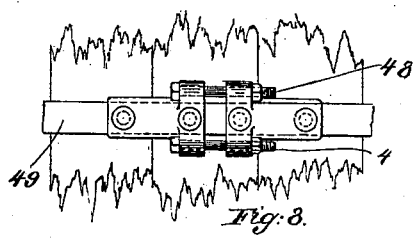
Figure 10:
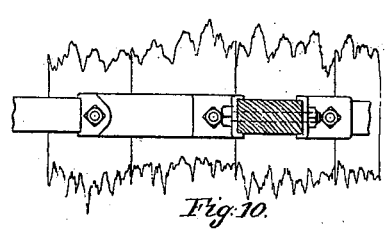
Figure 9:
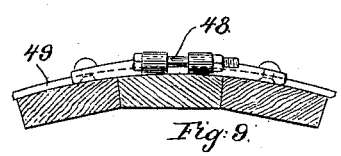
Figure 15:
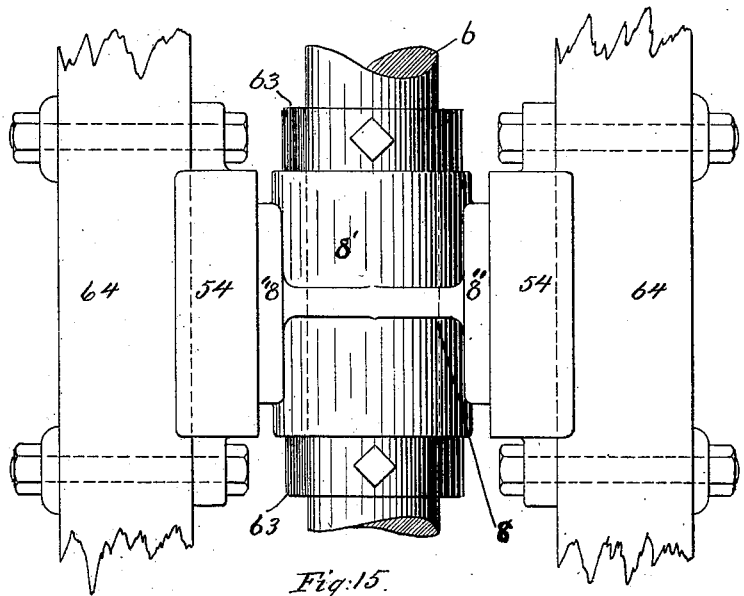
Figure 16:
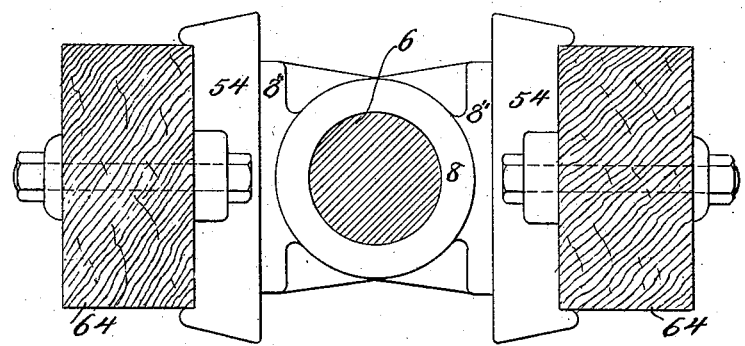

Figure 1 is a plan view of the complete apparatus, showing the hollow water-tight drum and the boat, which carries the shaft-bearing and pump or other operating mechanism when the motor is at work and serves to transport the apparatus when it is to be transferred to a different location. It also shows the pump and the shore connections as they are arranged when the motor is placed in a stream of water ready for operation. Fig. 2 is a side elevation of the same. Fig. 3 is a plan view showing the details of the wheel-shaft and the manner of its connection to the boat or floating pier and to the shore. Fig. 4 is a side elevation of the same. Fig. 5 is a detail and elevation of the wheel, showing the paddles and their relative positions at different points in the revolution of the drum. Figs. 6 and 7 are detail views showing, respectively, a side and an end elevation of the blades and their connection to the arms. Fig. 8 is a plan, and Fig. 9 a detail side view, of the buckle which fastens the binding-hoops about the drum. Fig. 10 is a plan, and Fig. 11 a side detail view, of the attachment of the arms to the drum. Fig. 12 is a detail view of an arm, showing provisions whereby sections of blades and arms may be removed from or added to the wheel and the motor thus adapted to streams of varying depth. Figs. 13 and 14 show a modification having pivoted and counterbalanced levers applied to so operate on the inner edges of the blades as to sustain them edgewise as they approach the water and release them as they enter it. Figs. 15 and 16 are respectively a top view of the sliding bearing and guide for the inner end of the shaft and a cross-section taken through the same.

Similar letters and figures represent similar parts throughout the several views.

1 represents the hollow water-tight drum complete with arms and feathering-blades attached; 2, a shaft on the outer end of the drum; 3, a bearing; 4, a cask or float; 5, a rod connecting 3 and 4; 6, a shaft on the inner end of the drum; 7 and 8, bearings; 9, a boat; 10, a pivot; 11, a pump; 12 and 13, sprocket-pulleys; 14, a chain or link belt; 15, a friction-clutch; 16, a winding-drum; 17, a shaft; 18, a crank and connecting-rod; 19, a flexible hose-pipe; 20, a rope; 21, a pulley fastened to post 25 on shore at a suitable place; 22, a pulley fastened to boat 9; 23, a loose pulley; 24, a rope; 25, 26, and 27, posts on the shore; 28, a pulley attached to post 27; 29, a pulley attached to pier 50; 30, a pulley attached to boat 9; 31 to 38, inclusive, successive positions of arms of the drum; 39, 40, and 41, respectively, the outer, middle, and inside blades attached to arms 42 of the drum; 43, 43ª, and 43ᵇ, castings used to bind the radial arms and their braces together; 44 and 45, angle-irons; 46, 47, and 48, bolts; 49, the binding-hoop of the drum; 50, a pier or girder extending from the shore to where the mechanism is operated; 51, a pivot in which bearings 7 is adapted to rotate in a vertical plane; 54, a guide in which bearing 8 is adapted to slide up and down when under action of the waves the shaft and wheel rock about pivot 51; 52, the tie-rods at the ends of arms 42; 53, a paddle; 55, a casting attached to the arm; 56, a bolt.

The drum is made water-tight, or practically so, and may be built of any suitable material. As a safeguard against possible leakage it may be provided with suitable means for exhausting or discharging any water that finds its way into it. It should, particularly when depending upon the water to tilt the blades as they enter it, be of such dimensions relative to the weight it has to carry as to support its axis sufficiently above the water-level to cause the radial arms to enter the water inclining downward. An illustration of this is shown in Fig. 5 of the drawings. To the outside of this drum is attached, preferably by means of angle-irons 44 and 45 and the necessary bolts, the radial arms 42, having pivotally attached to them blades running lengthwise of the drum, as shown, the pivotal supports of such blades being at the outer edge thereof, or when the blades are made in sections, as is preferable, being at the outer edge of each section. To the successive arms are rigidly attached suitable plates 55, usually made of metal. These plates are hinged to the arms 42 by means of bolts 56. The blades in the construction illustrated in Fig. 5 depend for their feathering on the action of the water as well when entering as when leaving the current, and this is made effective by causing the blades to encounter the surface of the water with their pivoted edges foremost and inclining downward, and by the sectional construction of the blades by which the successive arms are brought in contact with the water at a greater inclination than that at which the arm first strikes the water and by which the inner sections are prevented from opposing their weight to the tilting of the outer sections. The drum, as shown in Fig. 5, rotates to the right, the water being represented by A A flowing in the direction of the arrow. In positions 31, 32, 33, and 34 gravity will cause the blades to hang as shown. The outer section of the blade striking the water first swings to an approximately-vertical position and feathers into the water, the inner sections successively striking the water as the arm moves downward, each at a greater inclination than its predecessor, and assuming at once the position in which the least resistance is encountered. As the blades pass farther down the force of the water carries them against the arms 42, where they are supported in radial position, as shown at 36 and 37, enabling them to apply the full force of the current toward the rotation of the drum. As they approach position 38 they gradually tilt downward, so as to reduce to a minimum the resistance to their upward movement.

Figs. 13 and 14 show the blades 39 automatically held in tangential position by lever 57 and weights 58 as they enter the water, the weights being here shown as a hollow pipe or rod connecting the levers and maintaining their parallelism. The levers are pivoted at 60, as are latches 61, which swing freely in one direction and are stopped in the other by pin 62. When out of the water, the blades are supported by the weighted lever 57 resting against stop 59, as shown in Fig. 13. The relative position of stops and lever-pivots is such that as the blade enters the water the levers 57 swing sufficiently to let it pass and gradually assume a radial position as the current forces it against the arm 42. As it leaves the water levers 57 have again assumed a position adapted to support the blade when it swings against them in passing from 38 to 31.

The guide and sliding bearing for the inner end of the shaft are more particularly shown in Figs. 3, 15, and 16, the two former being top views and the latter a vertical cross-section. The guide 54 has two plates with plain bearing-surfaces secured to the inner faces of the timber 64 by bolts or other suitable means. The bearing 8 consists of a sleeve 8', in which the shaft revolves, having a containing-box with vertical plane faces 8" engaging with and sliding freely upon the opposing faces of the guide, thus permitting the shaft to rise and fall and rock to and from the horizontal plane. 63 are collars fixed to the shaft at each side of the bearing.

The arms are attached to the drum by means of the angle-irons 44 and 45 and are tied together at their outer end by the rods 52. (Shown in Fig. 5.) When the drum is made of wood, the staves are preferably bound together by bands and turnbuckles, as shown in Fig. 8, and the arms are attached directly to the bands, which thus tend to distribute the strain more evenly.

Figure 11:
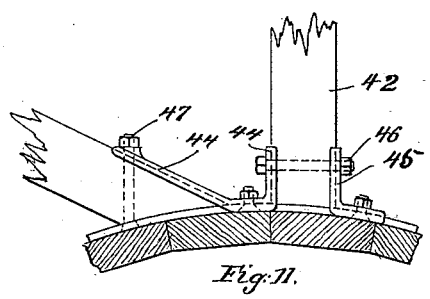

Both because it is objectionable to have the drum supported on the arms, as would be necessary if they were attached before floating it, and because of the great inconvenience of launching it with the arms attached, it is desirable to float the drum at the necessary depth of stream before the arms and paddles are attached to it. My invention provides convenient means for doing this. Arms of different lengths may at different times be used on the same drum, so as to adapt the wheel to be used in different depths of stream. This may be done either by using independent arms of different lengths or by having the arm 42 made in extension-sections, so that their length can be made equal to the combined width of two, three, or four paddles, as desired. One method of doing this is shown in Fig. 11, but I do not limit myself to the method shown.

When for any reason it is desired to move the motor to a different locality, the paddle blades and arms may be taken off from the drum and loaded into the boat and the drum disconnected from bearings 8 and 9 and attached by a rope or otherwise to the stern of the boat. The hose-pipe 19 and ropes 20 and 24 and their pulleys and the floating pier 50 may be loaded into the boat and the boat and floating drum towed to the desired point on the stream and set up ready for use again. It is also evident that the whole apparatus may be loaded into wagons and hauled overland to the new place of work.

The cask or float 4 is rigidly attached to the bearing 3 by means of the rod 5, and the pull of the water upon it tends to hold the bearing in its proper position on the shaft against the angular pull of rope 20, and thus prevent its binding on the shaft.

When the machine is placed in the stream ready for operation, as shown in Fig. 1, the drum 1 and boat 9 and all that they carry float upon the stream and are pivoted at the inner end to the shore pier at 10, while the outer end of the drum is held in position by the rope 20. (More fully described below.) The water passes the drum in the direction shown by the arrow, causing it to rotate in the bearings 3, 8, and 9, and the pulley 12 being rigidly attached to the drum rotates with it, thus driving the pump 9 by means of link belt 14, pulley 13, and shaft 17, and crank and connecting-rod 18. The pump 9 in its turn pumps water from the stream and forces it through the flexible hose-pipe 19 into the shore water-pipe, and thence wherever desired. If other work than pumping is to be done, suitable mechanism may be substituted for the pump and driven by the motor through suitable connections. Rope 20 is attached to the bearing 3 on the outer end of shaft 2 and from there extends over pulleys 21 and 22 and has its outer end attached to the loose pulley 23. Another rope having one end fastened to post 26 on the shore passes over pulleys 23, 28, 29, and 30 and has its outer end fastened to winding-drum 16 upon the boat and is adapted to be wound upon said drum. When for any reason it is desired to stop the wheel or to regulate the amount of power to be used or swing the wheel about, the operator throws in the friction-clutch 15, located on the rotating shaft 17. This clutch is rigidly attached to drum 16 and when thrown in causes it to rotate and wind rope 24 about it. The winding rope 24 draws pulley 23 to the right until it is in a straight line between posts 26 and 28; but pulley 23 in moving to this position draws in rope 20, and thus causes the drum and boat to swing about pivot 10 until the drum points up stream in a position parallel with the current and the paddles cease to act. By stopping the drum at any intermediate point, so that the current strikes the paddles at an angle, an intermediate amount of power between the maximum and minimum capacity of the wheel may be obtained. When the wheel is stopped and it is desired to start it again, the clutch is released and the drum is pushed out into the stream until the water strikes the blades of the wheel, when the current will carry it out the remainder of the way. The operator can operate the clutch so that it will act as a brake and not allow the wheel to go out too rapidly, or an independent brake may be used. I do not confine myself to the specific rope mechanism described, but show it as one practical method which may be used to swing the drum into and out of the current. When the drum is partially submerged, as it must be in a floating wheel, and its axis is carried somewhat above the level of the stream, the arms will strike the surface of the water in an approximately horizontal position, but with the outer end inclining somewhat downward, and hence striking the water first. It is especially important where the blades are not automatically tilted before entering the water to have the drum of such dimensions as to cause the impact with the water to occur after the blades have acquired a downward inclination, since if the entire surface of the blades strikes the surface of the water flatwise they will practically prevent the operation of the motor. It is also important that each section of the blade strike the surface of the water before the arm has become so nearly vertical as to endanger this section tilting outward and throwing its free end downward. When the arm has passed the horizontal plane before striking the water, the blade, pivoted at the outer end, will enter the water with its free edge inclining upward. If the blades extended continuously in a radial direction from the drum to the outer edge, they would as they struck the water in this position tend to arrest the rotation of the wheel with a violent shock, the more so as their radial extent out of the water is increased. As the outer edge of the blade enters the water the inner edge and the bulk of its weight are still out of contact with the water and its gravity operates with a powerful leverage to prevent that portion which has entered the water from tipping up, so as to descend edgewise, thus causing it to act as a positive brake on the rotation of the wheel. The resistance thus produced is so great that my early experiments with floating water-wheels where the blades were continuous radially convinced me that they could not be used to advantage without some automatic means of tilting the blades before they entered the water, such as I have referred to; but upon further experiment I discovered that by dividing the blades radially into two or more independent sections and pivoting them as shown and making the drum of such relative dimensions as to float the axis high enough to cause the arms to enter the water with a downward incline the resistance encountered in entering the water was reduced to a surprising degree and so as to make the motor very efficient. The shock and strain on the wheel are thus substantially avoided. It will be observed that if the blade-section 39 extended to the drum all that portion between the drum and the end of the section here shown as 39 would be acting as a counterpoise to hold 39 down flatwise from the time it came in contact with the water until its inner edge encountered the water, the leverage given by this long projection above the water making this resistance very stubborn, while the same cause would operate on 40 during the time it was entering the water. The blade would thus be held flatwise at the outer end of the arms where the resistance is more felt while entering the water far enough to substantially arrest the wheel. If the drum were sunk to the level of its axis, the blades would strike the water flatwise and at the greatest disadvantage. With the construction and arrangement shown the inner sections which are out of the water afford no resistance to the tilting of the outer section and encounter no resistance themselves until the arms have assumed a more favorable angle than that at which the outer section enters the water. It is desirable to make the outer section narrower than those within. I have found with a drum six feet in diameter that an outer blade section of ten inches width, the next section of twelve inches, and the next of fourteen inches give excellent results. This division of blades also enables the motor to be adapted to different depths of stream by removing and replacing the outer sections, one or more, as changes in the depth may require. This is facilitated by the provision for removing and replacing sections of the arms illustrated in Fig. 12, though solid detachable arms of different lengths may be used and the requisite number of blade-sections radially attached to them.

So much of this invention as relates to the provision for automatically holding the blades edgewise when approaching the water-level is included in my application filed December 21, 1895, Serial No. 572,869, in which these features are more specifically described.

I claim—

1. A water-motor having in combination a vertically-rotating floating drum, radial arms projecting therefrom, feathering-blades pivotally supported thereon, a shaft extending laterally from said drum, a floating pivotal support for such lateral extension extended longitudinally of said shaft, and rocking and vertically-movable bearings supported thereon, substantially as described.

2. In combination with the floating drum of a water-motor, the radial arms adapted to be attached to the periphery of said drum and removed therefrom when said drum is floating, and the pivoted blades divided in sections radially, removably mounted on and radially supported by said arms, for the purposes described.

3. In combination with the floating drum of a water-motor, the radial arms having removable sections, and feathering-blades divided radially to correspond therewith, for the purposes described.

4. In combination with the floating drum having radial feathering-blades, the floating pivoted pier-support carrying rocking bearings for the drum-shaft, a floating support for the pump or other operated mechanism, means for transmitting the power of the wheel thereto, and means for sustaining the outer end of the shaft against the current, substantially as described.

5. In a water-motor, the combination of a floating wheel provided with suitable propelling-blades, a pivoted support for its shaft at one side of said wheel, and means for swinging said wheel to different angles relative to the current in which it works, for the purposes specified.

6. In a water-motor the combination of a floating drum with suitable propelling-blades, a shaft extended laterally from one side of said drum, a floating pivoted pier in line therewith in which said shaft is journaled, and means for applying the power of the wheel to draw the opposite end of its shaft upstream and thereby change its angle to the current, for the purposes specified.

7. In combination with the floating drum, the radial arms removably secured to the periphery thereof, the sectional blades pivotally secured on said arms at the outer edge of said sections, respectively, and adapted to be supported by said arms in radial position with their free ends extended inward, tie-rods connecting said radial arms, and means for securing said drum on the shaft independently of said radial arms, substantially as described.

8. In combination with the floating drum of a water-motor, the shaft, a rocking bearing in which said shaft turns, floating supports for said bearing, a bearing for the opposite end of the shaft, and a cable connecting said last-mentioned bearing to the shore, substantially as described.

9. In combination with the floating drum of a water-motor, the shaft carried thereby, the rocking bearing mounted in a floating support in which said shaft rotates, a bearing carried by the opposite end of said shaft secured to a cable whereby it is supported against the pull in the direction of the current, and a float connected to said bearing tending to keep the same in alinement with the shaft, substantially as described.

10. In combination with the floating drum of a water-motor, the shaft by which it is held at the desired angle to the current, the radial arms mounted on said drum independently of its connection with the shaft, and adapted to be applied and removed while the drum is afloat, and the blades pivotally mounted on said radial arms, substantially as described.

11. In a water-motor, the combination of the floating drum, the shaft carried thereby, the peripheral bands around said drum, the radial arms applied to the surface of said drum and projecting therefrom removably secured to said bands, and propelling-blades pivotally secured to said radial arms, substantially as described.

JOSIAH E. SYMONS.

Witnesses:
CHARLES L. HINE,
D. B. CHEEVER.